Dec. 21, 1943.  W. C. McBAIN  2,337,260
OIL CLEANING APPARATUS
Filed March 24, 1941  2 Sheets-Sheet 1

INVENTOR
William C. McBain
by his attorneys
Stebbins and Blenko

Dec. 21, 1943.  W. C. McBAIN  2,337,260
OIL CLEANING APPARATUS
Filed March 24, 1941  2 Sheets-Sheet 2
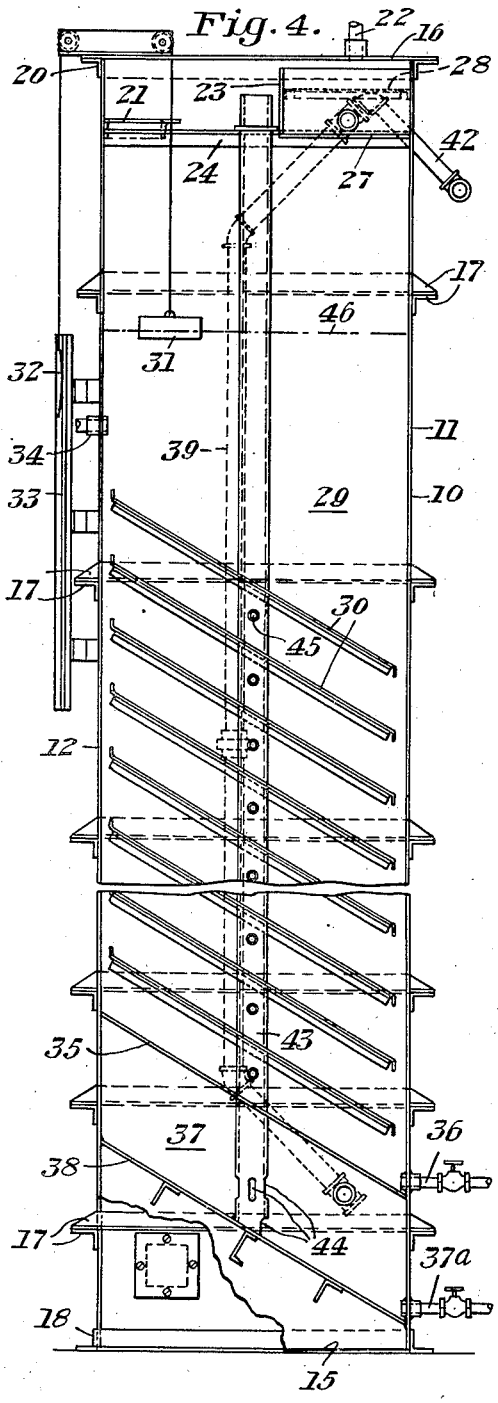
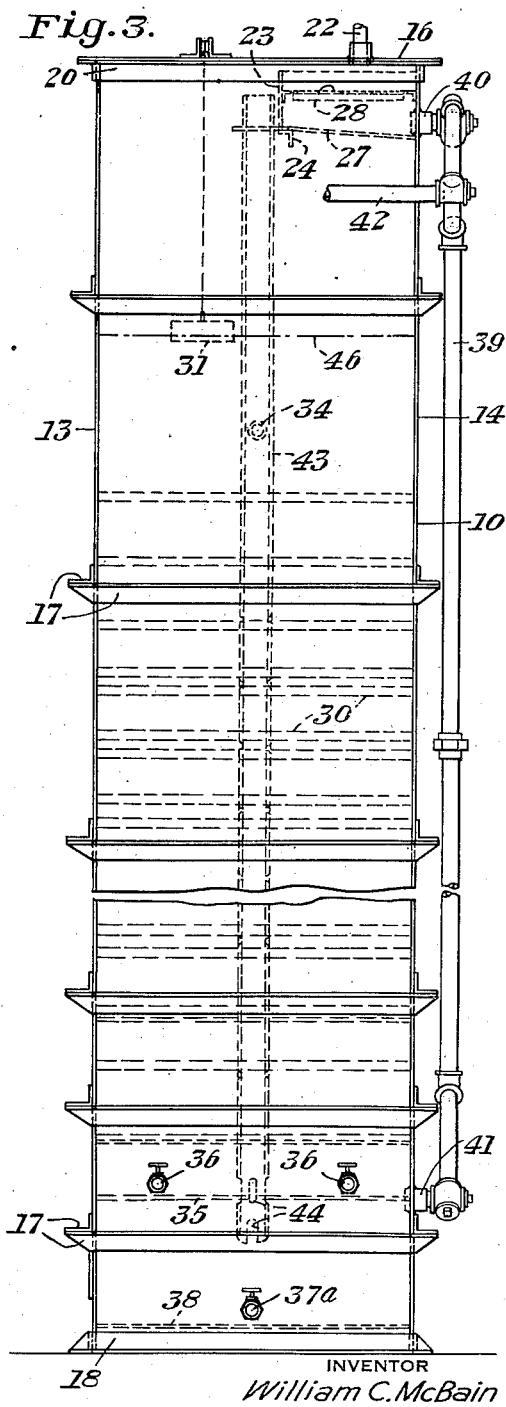
INVENTOR
William C. McBain
by his attorneys
Stebbins and Blenko Patented Dec. 21, 1943

2,337,260

UNITED STATES PATENT OFFICE 2,337,260

OIL CLEANING APPARATUS

William C. McBain, Youngstown, Ohio

Application March 24, 1941, Serial No. 384,859

4 Claims. (Cl. 210—52.5)

This invention relates generally to the treatment of fluids and, in particular, to the cleaning of liquids, especially oil.

Oil of various grades is widely used in industry, not only as a lubricant, but also as a coolant, rust preventive or the like. After a period of use, the oil is found to contain suspended impurities such as dirt, water, carbon and metal particles or other materials which impair its effectiveness and introduce a hazard to the safe operation of machinery. Numerous methods and apparatus have been proposed heretofore for reclaiming used oil by subjecting it to a cleaning operation.

I have invented a novel method and apparatus for cleaning used oil which are simple and inexpensive and at the same time more effective than apparatus and treatments used previously for this purpose. The invention provides a more thorough separation of the usable oil from the impurities than has been obtained heretofore, with the result that a greater percentage of the dirty oil is recovered or, conversely, a smaller percentage of it is drawn off with the accumulations of sludge containing the various impurities.

In a preferred embodiment and practice of the invention, I provide an oil cleaning apparatus in the form of a relatively tall tank including a chamber adapted to contain a relatively large pool of oil and to maintain it in a quiescent state for gravity settling of the suspended impurities. A preliminary or initial settling chamber is disposed below the principal or final settling chamber first mentioned and in heat exchange relation thereto. Small amounts of warm, dirty oil are supplied to this initial settling chamber and the heat therefrom is transferred to the lower layers of oil and sludge in the principal settling chamber, thereby expediting the separation of the oil and the impurities suspended therein.

Further novel features and advantages of the invention will become apparent during the following detailed description which refers to the accompanying drawings illustrating the preferred embodiment and practice outlined above. In the drawings, Figure 1 is a plan view of an oil treating tank according to my invention;

Figure 3 is a front elevation; and

Figure 4 is a side elevation with the greater portion of the side wall broken away.

Figure 1:
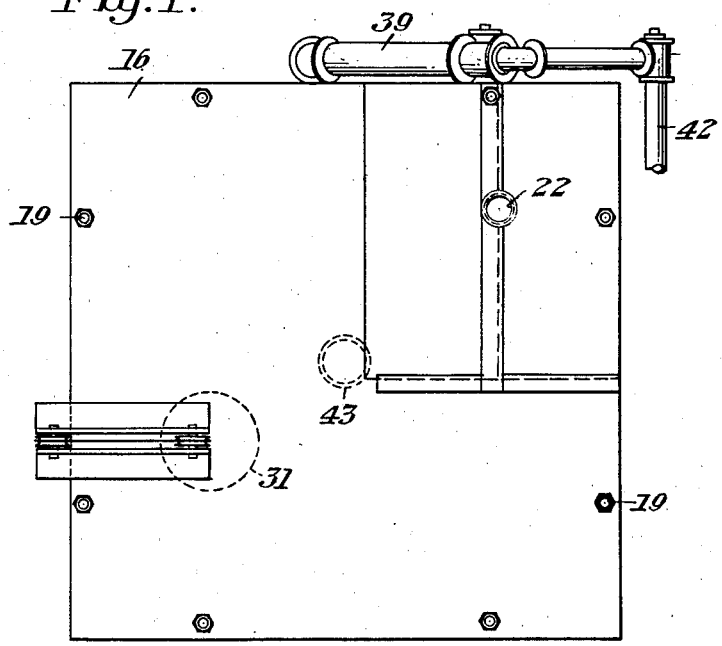
Figure 2:
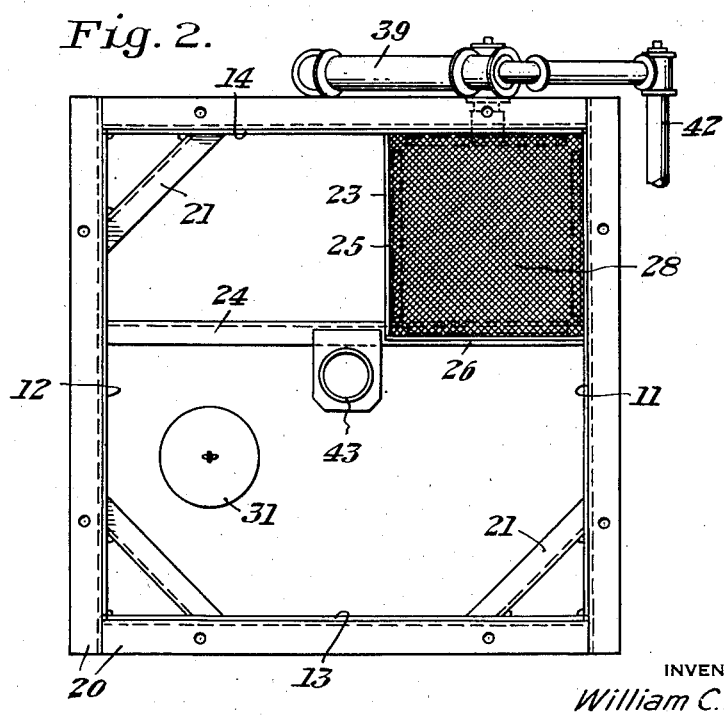
Figure 2 is a plan view with the top plate removed.

Referring now in detail to the drawings, a treating tank 10 includes front and rear walls 11 and 12, side walls 13 and 14, a bottom 15 and a top 16. Intermediate their upper and lower ends, the walls are provided with stiffening transverse angles 17 welded thereto, the ends of which overlap and are secured together as by welding. The bottom 15 is also welded to the walls, and angles 18 are secured to the walls adjacent the bottom. The top 16 is removably held on the tank by bolts 19 passing through the horizontal flanges of angles 20 secured to the walls adjacent the upper edges thereof. Corner braces 21 composed of short lengths of angles are welded to the tank walls near the top. The top 16 is provided with an inlet 22 through which dirty oil is supplied to the apparatus.

A head-box 23 is mounted in the upper end of the tank, in one corner thereof, being supported on a cross-angle 24 and composed of side walls 25 and 26 and a bottom 27. The inlet 22 is positioned directly over the head box 23 and the latter is provided with a screen 28 for removing the coarser solid particles entrained with the oil delivered to the tank.

The portion of the tank below the head-box 23 provides a principal settling chamber 29. The chamber is provided with a plurality of parallel, inclined, vertically spaced deflector or baffle plates 30. The plates 30 extend between the side walls 13 and 14 and are secured thereto as by welding, but terminate short of the front and rear walls 11 and 12. The function of the plates is to prevent agitation of the oil and guide ascending streams of clean oil toward the rear wall and descending particles of precipitate such as dirt, carbon, metal particles or water globules toward the front wall. The plates 30 thus aid in separating the oil from the impurities by guiding the cleaned oil in one direction and the precipitate in the other.

A relatively large pool of oil is normally maintained in the chamber 29. A float 31 and an indicator 32, cooperating with a scale 33, reveal the height of the oil in the chamber 29. An outlet 34 for clean oil extends through the rear wall 13 in the upper portion thereof. The precipitate settling out of the oil in the chamber 29 collects on a sloping transverse partition wall 35 and may be withdrawn at intervals through sludge outlets 36.

I utilize the heat contained in the warm, dirty oil delivered into the head box 23, to facilitate separation of the oil and precipitate in the chamber 29. To this end, I deliver small additions of warm, dirty oil from the head box into a preliminary or initial settling and heat-transfer chamber 37, defined by the partition 35, a sloping bottom wall 38 and the side, front and rear walls of the tank. An outlet 37a for draining the chamber 37 extends through the front wall 11. A downcomer 39 has a connection 40 extending through the side wall 14 into the head-box 23 and a connection 41 communicating with the chamber 37. An overflow pipe 42 is connected to the upper end of the downcomer and to a return pipe (not shown) leading to a sump or other reservoir for used oil.

An uptake 43 extends from the bottom wall 38 of the chamber 37 through the partition 35 and the deflector plates 30. The uptake has openings 44 communicating with the chamber 37 and holes 45 opening into the spaces between adjacent plates 30. The upper end of the uptake extends to a height above the bottom of the head-box 23 and is there open to atmospheric pressure.

To explain the method of my invention with reference to the apparatus described above, it will be assumed that the tank 10 is filled with oil to a level such as that indicated at 46. The oil in the chamber 29, as already explained, is undergoing a settling treatment and is maintained relatively quiescent. The chamber 37 is likewise filled with oil which is undergoing a preliminary or initial settling. Small additions of warm, dirty oil delivered to the head-box 23 (as by a suction pump drawing the oil from a collecting sump) flow through the downcomer 39 and into the chamber 37, displacing a corresponding quantity of the oil contained therein which flows through the uptake 43 and into the spaces between the plates 30. The warm, dirty oil delivered to the chamber 37 undergoes a preliminary settling. The heat contained therein, furthermore, is transmitted through the partition 35 and the side, front and rear walls of the tank to the lower layers of the oil in the chamber 29 and the sludge accumulated at the bottom thereof. This heat effects further separation of the oil and solids deposited on top of the partition 35 in the form of a sludge. The oil displaced from the chamber 37 into the chamber 29 is subjected in the latter to a final prolonged settling treatment in a relatively quiescent state. The level of the oil in the chamber 29 is raised by the addition of warm, dirty oil to the system unless corresponding quantities are withdrawn from the outlet 34.

After the apparatus has been in operation for a substantial period of time, the precipitate collecting on the partition 35 may be removed through the outlets 36. It is in the form of a thick, viscous mass of pasty consistency composed of the solids and water precipitated from the oil which has been treated. The precipitate contains very little oil because of the high efficiency of the invention in separating the oil from the impurities contained therein. Since some settling also takes place in the chamber 37, it is desirable to open the outlet 37a occasionally to remove the precipitated material.

It will be apparent from the foregoing description that the invention provides a simple and relatively inexpensive apparatus and a highly efficient method for reclaiming dirty oil so that it may safely be used again for various purposes, i. e., lubrication, cooling, rust prevention, etc.

While I have illustrated and described but a preferred embodiment and practice of the invention, it will be recognized that changes in the construction and operation disclosed may be made without departing from the spirit of the invention or the scope of the appended claims.

I claim:

1. In an oil-cleaning apparatus, a tank, a head-box near the top of the tank adapted to receive used oil, a heat-conducting cross-wall dividing the tank into a final settling chamber and a preliminary settling chamber therebelow, vertically spaced deflector trays in said final settling chamber, an outlet for drawing clean oil from said final settling chamber, a conduit connecting said head-box to said preliminary settling chamber, and an uptake extending from said preliminary settling chamber to said final settling chamber through said cross-wall and deflector trays, whereby the used oil is brought into heat-exchange relation with sludge precipitated from oil previously delivered to the final settling chamber before passing thereinto by way of said uptake.

2. In an oil-cleaning apparatus, a tank, a heat-conducting cross-wall dividing the tank into a final settling chamber and a preliminary settling chamber therebelow, a sludge outlet near the bottom of said final settling chamber, vertically spaced deflector trays in said final settling chamber, an outlet for drawing clean oil from said final settling chamber, an uptake extending from said preliminary settling chamber through said cross-wall and deflector trays, and an inlet communicating with said preliminary settling chamber, whereby used oil is brought into heat-exchange relation with sludge precipitated from previously treated oil and accumulating in the lower portion of the final settling chamber, before passing into the latter by way of said uptake.

3. In an oil-conditioning apparatus, a tank, a head box near the top of the tank adapted to receive used oil, particularly oil that has collected impurities and been heated in use, a conduit connecting said head box to a preliminary settling chamber at the bottom of said tank, a heat-conducting cross-wall separating the aforesaid preliminary settling chamber from the remainder of the tank and thereby providing a final settling chamber located directly above said preliminary settling chamber and in heat-exchange relation therewith, a passageway for conveying oil from the preliminary settling chamber to the final settling chamber, inclined, spaced, baffle-deflector trays in said final settling chamber, an outlet suitably located for drawing clean oil from said final settling chamber and outlets suitably located for withdrawing the sediment from each of the settling chambers.

4. In an oil-cleaning apparatus, a tank including a settling chamber adapted to receive used oil which has become heated in use, said chamber having deflecting trays spaced vertically therein, an outlet for clean oil near the top of said chamber, a sludge outlet near the bottom of said chamber, a heat-conducting wall extending across said tank below said trays having its upper surface in contact with the sludge precipitated from the oil undergoing treatment in said settling chamber, an uptake extending upwardly from said wall through said trays and having discharge ports between the latter, and means delivering used oil in contact with the lower surface of said wall whereby the heat content of the used oil below said wall is at least partially conducted through said wall to the oil and precipitate in said chamber.

WILLIAM C. McBAIN.